United States Patent

Chen et al.

[11] Patent Number: 5,917,962
[45] Date of Patent: *Jun. 29, 1999

[54] METHOD AND APPARATUS FOR PARTITIONING AN IMAGE

[75] Inventors: Marilyn Chen, Atherton; Allen M. Chan; Kok S. Chen, both of Sunnyvale, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/466,969

[22] Filed: Jun. 6, 1995

[51] Int. Cl.$^6$ .............. G06K 9/36; G06K 9/34; G06K 9/48; G06K 9/32

[52] U.S. Cl. .......... 382/291; 382/176; 382/199; 382/249; 382/294

[58] Field of Search .................. 382/173, 268, 382/276, 289, 293, 232, 249, 176, 239, 257, 199, 151, 282, 291, 295, 294; 358/448; 395/136

[56] References Cited

U.S. PATENT DOCUMENTS

| | | | |
|---|---|---|---|
| 5,003,299 | 3/1991 | Batson et al. | 340/703 |
| 5,065,447 | 11/1991 | Barnsley et al. | 382/249 |
| 5,068,644 | 11/1991 | Batson et al. | 340/701 |
| 5,307,180 | 4/1994 | Williams et al. | 358/448 |
| 5,345,863 | 9/1994 | Kurata et al. | 101/126 |
| 5,347,600 | 9/1994 | Barnsley et al. | 382/249 |
| 5,371,515 | 12/1994 | Wells et al. | 345/149 |
| 5,384,867 | 1/1995 | Barnsley et al. | 382/249 |
| 5,475,803 | 12/1995 | Stearns et al. | 395/136 |
| 5,513,279 | 4/1996 | Yoshinari et al. | 382/232 |
| 5,696,842 | 12/1997 | Shirasawa et al. | 382/176 |

FOREIGN PATENT DOCUMENTS 7250248  9/1995  Japan .............. H04N 1/415

OTHER PUBLICATIONS

Bareket, R. et al., "Fractal Image Compression Using A Motorola DSP96002", pp. 658–661.
Wolberg, G., "Digital Image Warping", 1992, pp. 187–229.
Barnard, G. et al., "Reducing The Block–Effect In Transform Image Coding", 1989, pp. 97–101.
Data Compression Techniques and Applications, Thomas J. Lynch, Ph.D, Van Nostrand Reinhold Company, New York, 1985, Table of Contents, plus Chapter 5, Transform Coding, pp. 68–81.
Tilings and Patterns–An Introduction, Branko Grunbaum et al., W. H. Freeman & Company, New York, 1989, 3 pages, including Contents page.
Inside Macintosh™, Volumes I, II, and III, Addison–Wesley Publishing Company, Inc., 1985, 3 pages, including a page labelled I–470 Toolbox Utility Routines.
Graphics File Formats, David C. Kay et al, Windcrest®/McGraw–Hill, 1992, Table of Contents, plus Chapter 15, JPEG, pp. 141–148.

(List continued on next page.)

*Primary Examiner*—Bipin H. Shalwala
*Attorney, Agent, or Firm*—Burns, Doane, Swecker & Mathis, L.L.P.

[57] ABSTRACT

The present invention is directed to providing a method and apparatus for enhanced processing of partitioned image data in a manner which permits efficient processing (for example, real-time processing) of the image data without sacrificing the quality of the reconstructed image. In accordance with exemplary embodiments, image data associated with a partitioned frame of input image data is stored along with information which identifies relative placement of each partitioned subimage within the frame of image data. The information is retained during processing of the input frame of image data, such that the original image can be reconstructed therefrom without the inclusion of holes or artifacts due to misalignment of boundaries. Thus, an input frame of image data which has been partitioned can be efficient transmitted, stored and rendered without concern that quality of the reconstructed image will be sacrificed.

20 Claims, 3 Drawing Sheets

OTHER PUBLICATIONS

Graphics Gems II, "11.4 Fast Anamorphic Image Scaling", by Dale A. Schumacher, 1991, Academic Press Inc., ESEN 0–12–064480–0, Title Page and pp. 78–79.

PostScript Language Reference Manual, Second Edition, by Adobe Systems Incorporated, 1990, Title Page, and pp. 305–307.

Digital Image Warping, by George Wolberg, ISBO–8186–8944–7, 1994, pp. 42–45.

METHOD AND APPARATUS FOR PARTITIONING AN IMAGE

BACKGROUND OF THE INVENTION

1. Field of the Invention

The present invention relates generally to processing of image data used, for example, to represent text, graphics and scanned images. More particularly, the invention relates to processing of image data by partitioning the image into a plurality of subimages.

2. State of the Art

Digitized images displayed on scanners, monitors and printers are typically quantized on a pixel-by-pixel basis and stored in memory as pixel maps, more commonly referred to as pixmaps. A pixmap is a two-dimensional array of picture elements mapped to locations of the digitized image.

To provide sufficient color range and fidelity, each pixel is typically stored in memory as a set of color coordinates which define the pixel's color location in a given color space. For example, a pixel is typically represented by its red, green and blue color component values, or by its cyan, magenta and yellow color component values. The fidelity of the color reproduction is a function of the accuracy with which each color component is represented.

Due to the increased volume of data required to represent color images, effort has been directed to decreasing the memory requirements associated with color data pixmaps to provide more efficient transmission and storage of the image. A known technique for enhancing processing speed is to divide the input frame of image data into a plurality of subdivided, or partitioned areas, so that each subdivided area can be individually processed. However, a common problem encountered when an input frame of image data is divided into blocks is that pixels of the subdivided images are not properly transformed to an output space wherein the original image is to be reconstructed.

Figure 3A:
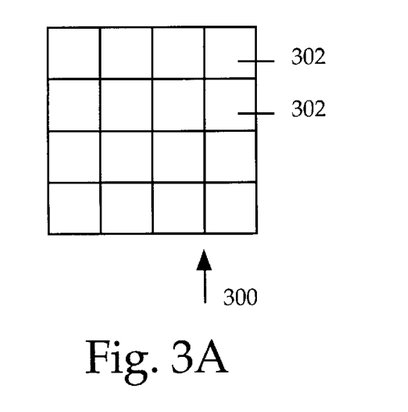
FIGS. 3a–3c illustrate an image partitioned model and reconstructed image model.

For example, FIG. 3a illustrates an image represented as a frame of image data. This frame of image data is shown divided into a plurality of subdivided images which can be individually processed. By dividing the frame of image data to a plurality of subdivided images, memory requirements associated with processing components can be reduced since only a single subdivided image need be stored in memory at any given time during processing.

However, it is often desirable to transform the image represented by the input frame of image data in FIG. 3a to a different scale or resolution for output (e.g., output on a display or printer). Further, it is often desirable that the image represented by the frame of input image data in FIG. 3a be skewed or rotated for subsequent output. For example, it may be desirable to scale a 300 pixel by 300 pixel input frame of image data to a printer output frame of 1000 pixels by 1000 pixels. Because 1000 is not an integer multiple of 300, a direct mapping of each pixel in the input frame to a set number of pixels in the output frame is not possible. As a result, some pixels in the output frame may be left unmapped thereby creating an appearance of holes in an output image which is produced using the output image data.

Figure 2A:
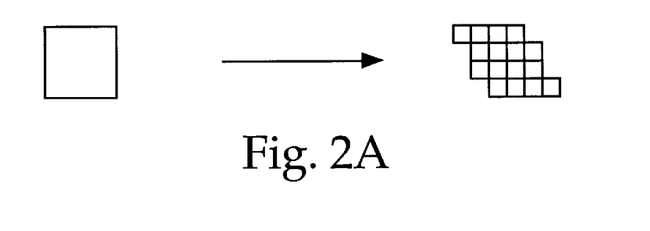
FIGS. 2a and 2b illustrate exemplary image pixels in both input and output spaces.
Figure 2B:
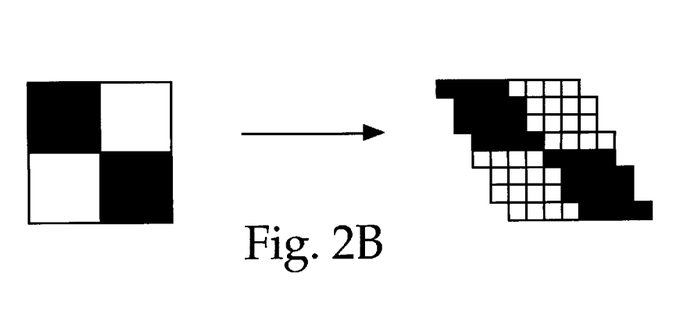

In addition, it may be desired to skew or rotate the input frame of image data to produce a rotated image at the output device. Those skilled in the art will appreciate that when the plurality of subimages illustrated in FIG. 3a are skewed or rotated, some additional pixel locations in the output frame of image data will not be mapped to any subimage of the input frame of image data. That is, a rectangular subimage which encompasses a 3×3 pixel array of the input frame, when skewed or rotated by a fixed angle, will no longer be defined by a rectangular pixel array in the output frame. See, for example, FIG. 2a wherein an image is represented by a plurality of pixels which form a square. However, once the image is skewed, it is no longer represented by a plurality of pixels which represent a square in the output frame buffer. FIG. 2b shows a similar example for plural subimages which are skewed. Again, pixels which are not mapped to any of the subimages in the input frame of image data will appear as holes in the output image when it is displayed or printed.

Thus, computational errors, such as errors in rounding or truncation when an image is transformed, can result in an incomplete allocation, or mapping of pixels in an output frame of image data among the various subimages of the input frame of image data. If the pixel locations in an output frame buffer which stores the output image data are not accurately mapped to the various subimages of the input frame of image data, image artifacts will appear along boundaries between subimages when the original image is reconstructed, and will be readily apparent to the unaided eye.

A known technique for addressing the inaccuracies associated with processing partitioned image data is to divide the input frame of image data into several overlapping subimages so that gaps between subimages will not occur in the output frame buffer. However, such techniques do not resolve misalignments of boundary artifacts. For example, misalignments between the plurality of subimages in the output frame of image data can produce image artifacts due to the inaccurate representation of the boundaries between subimages.

Another technique for addressing the inaccuracies of transforming partitioned image data into an output frame buffer includes mapping the pixel locations between the input frame of image data and the output frame of image data to avoid boundary misalignments. Mapping techniques between an input space associated with the input frame of image data and an output space associated with the output frame of image data are of two general types: (1) those that perform image transformation from an input device space to output device space using forward mapping; and (2) those that perform image transformation from an input device space to an output device space using inverse mapping. These latter two techniques are described in a book entitled "Digital Image Warping", by George Wolberg, ISBO-8186-8944-7, 1984, pages 42–45.

Forward mapping generally refers to a mapping from an input image space to an output device space by copying each input pixel onto the output image in a frame of output image data at positions determined by X and Y mapping functions, as described for example in the aforementioned Wolberg book. Although forward mapping can efficiently map an input frame of image data to an output frame of image data, this technique suffers the drawback of having holes in the output image when reconstructed. For example, when an input image is resampled to produce an output image (e.g., scaled and/or rotated), forward mapping cannot accurately map every pixel in the output frame of image data to a particular pixel of a subimage in the input frame of image data. Rather, some pixels in the output image are left unmapped to a subimage of the input frame due, for example, to the rounding or truncation which occurs when the input image is transformed to the output space.

The inverse mapping technique is performed by computing a mapping of every output pixel to the input image.

Although inverse mapping guarantees that no holes will result in the reconstructed image, this technique suffers the drawback of much slower performance because a computation must be performed for each pixel in the output frame of image data. That is, a computation is used to identify all pixels in the input frame of image data which are to be mapped to that particular output pixel.

Accordingly, it would be desirable to provide a technique for partitioning image data such that the image data can be efficiently processed in a manner whereby the reconstructed image does not include holes due to misalignment of boundary artifacts, yet which achieves performance which is equal to or better than that associated with conventional techniques such as forward mapping.

SUMMARY OF THE INVENTION

The present invention is directed to providing a method and apparatus for enhanced processing of partitioned image data in a manner which permits efficient processing (for example, real-time processing) of the image data without sacrificing the quality of the reconstructed image. In accordance with exemplary embodiments, image data associated with a partitioned frame of input image data is stored along with information which identifies relative placement of each partitioned subimage within the frame of image data. The information is retained during processing of the input frame of image data, such that the original image can be reconstructed therefrom without the inclusion of holes or artifacts due to misalignment of boundaries. Thus, an input frame of image data which has been partitioned can be efficiently transmitted, stored and rendered without concern that quality of the reconstructed image will be sacrificed.

If an image contains significant amounts of data, such as with a large image, a high resolution image or an image where continuous tone (contone) color is desired, memory requirements associated with processing the image data can be significantly reduced, since each subimage can be processed individually. Subsequent processing (for example, compression of the output frame of data) can also be efficiently implemented. By initiating processing of subimages without having to wait for an entire frame of input image data, the rendering of the image can be performed during throughput of image data in a pipelined architecture. Further, those skilled in the art will appreciate that multiple processors can be exploited to operate upon different subimages of a partitioned image, and to thereby further enhance overall processing efficiency of the input image data without affecting quality of the reconstructed image. Exemplary embodiments achieve such advantages using a technique which provides performance equal to or better than that associated with conventional partitioning techniques, such as forward mapping.

Generally speaking, exemplary embodiments relate to a method and apparatus for processing image data comprising the steps of: receiving a frame of image data; dividing the image data into a plurality of non-overlapping subimages; and storing each divided subimage with information used to identify a relative position of said subimage with respect to an original image from which said image data was derived.

BRIEF DESCRIPTION OF THE DRAWINGS

Other objects and advantages of the present invention will become more apparent from the following detailed description of preferred embodiments when read in conjunction with the accompanying drawings wherein like elements are designated by like numerals and wherein.

DETAILED DESCRIPTION OF THE PREFERRED EMBODIMENTS

1. System Overview

Figure 1:
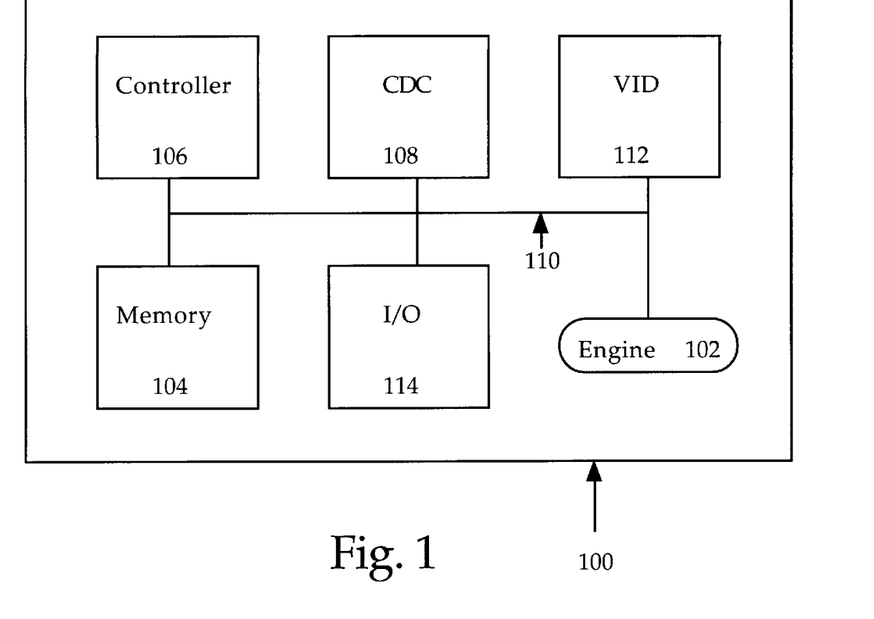
FIG. 1 illustrates a printing control system which incorporates an exemplary embodiment of the present invention.

FIG. 1 illustrates an exemplary embodiment of an apparatus for processing an input frame of image data in accordance with an exemplary embodiment of the present invention. As referenced herein, image data corresponds to data obtained from an image that can be digitized for storage in a pixmap and subsequently compressed. Image data that is processed in accordance with exemplary embodiments of the present invention can be digitized image data captured through any instrumentation, such as a video camera.

Image data as referenced herein encompasses scanned data as well as non-scanned data. Non-scanned data typically includes character glyphs and graphical data, such as hand-sketched or computer generated graphics. Those skilled in the art will appreciate that image data processed in accordance with exemplary embodiments of the present invention can also include any combination of scanned and non-scanned data.

As referenced herein, a frame of image data corresponds to a preselected group of digitized data, such as the data associated with a display screen or a printed sheet. Typically, such image data is obtained from or reproduced using a scanner device, a monitor or a printing device. However, those skilled in the art will appreciate that the image data can merely be processed for transfer between two locations (for example, between two computers).

It will be appreciated that exemplary embodiments of the present invention can be applied to the processing of image data for reproduction using any visual medium. In the case of printing, the image will typically be reproduced on conventional size paper such as letter size, A4, B5 and legal size. However, those skilled in the art will appreciate that the present invention can be applied to images of any size which are reproduced in any format.

To facilitate an understanding of the present invention, FIG. 1 illustrates a printing system 100 which incorporates features of the present invention. The FIG. 1 printing system includes a color laser engine 102, such as any commercially available color laser marking engine. For purposes of the following discussion, the term "color" includes use of multiple colors (such as red, green and blue), as well as gray-scale printing using varying shades of gray.

Referring to FIG. 1, an incoming frame of data is directed by a processor, represented as printing system controller 106 having associated memory 104, to a compression/decompression coprocessor 108 (CDC). Because the memory required to store an entire frame of image data within the printing system 100 is impractical, an entire frame of uncompressed data is not stored within the printing system 100 at any given time. Rather, a frame buffer stores the incoming frame of image data in portions (for example, on a row-by-row basis), for sequential processing. As each portion of the frame is processed, another portion is fetched by the printing system controller. As a result, the entire frame of image data is only stored in the print system 100 in compressed form.

In accordance with exemplary embodiments, the printing system controller 106 can be a reduced instruction set computer (RISC) such as the 33 Megahertz 29030 processor available from Advanced Micro Devices. The printing system controller 106 pre-processes an incoming frame of image data to: (a) scale the image data to a desired resolution; (b) partition the image data into partitioned blocks of a predetermined size; (c) resample the image data to ensure its alignment with the partitions; (d) filter the image data to ensure that each partitioned block contains no more than a predetermined number of color variations; and (e) create a side information buffer with information acquired during the pre-processing that can be used to enhance performance during subsequent processing.

In accordance with exemplary embodiments, the compressing of image data includes a step of classifying each partitioned block based on whether the partitioned block is determined to be color variant or determined to be color invariant. This step of classifying can be implemented by comparing the pixels within a given partitioned block to one another during the pre-processing to determine whether a given partitioned block is color variant or color invariant. Once having classified each partitioned block as being either color variant or color invariant, the compression/decompression co-processor 108 can be used to further compress the data. Those skilled in the art will appreciate that the steps of classifying each partitioned block as being either color variant or color invariant can be performed by the printing system controller 106 as part of the pre-processing (for example, classification information can be stored in the side information buffer), or can be performed by the compression/decompression coprocessor 108.

The compression/decompression coprocessor 108 can, for example, be formed as a monolithic application specific integrated circuit (that is, an ASIC chip). However, those skilled in the art will appreciate that the processing implemented by the coprocessor 108 can be performed by the same processor used to implement the functions of the controller 106. The compression/decompression coprocessor compresses the image data included in the partitioned blocks of pixels to substantially reduce the memory requirements required to store a frame of image data.

In accordance with exemplary embodiments, the compression/decompression coprocessor compresses the image data within each partitioned block by representing a block which is determined to include color variations with less color fidelity than a block which is determined not to include color variations. Further, the compression/decompression coprocessor uses memory (that is, any specified memory) for storing the compressed image data as a representation of the original image. Alternately, the compressed image data can be immediately transmitted from the printing system 100 as it is compressed, for external buffering and decompression.

In an exemplary embodiment, a decompression engine is included within the compression/decompression coprocessor for use during the compression process. Recall that an entire frame of uncompressed image data is not stored in the printing system 100 at any given time; rather the entire frame is stored and compressed in sequentially processed portions. The decompression engine is provided within the compression/decompression coprocessor to accommodate a situation where newly received image data is to be superimposed on portions of the frame which have been earlier compressed. In this situation, the earlier compressed portion of the frame is retrieved, decompressed and returned to the frame buffer. The decompressed data which has been returned to the frame buffer is then overlaid with the newly received image data, after which the superimposed image data is recompressed.

Those skilled in the art will appreciate that the compression/decompression coprocessor need not be implemented using a separate chip; rather the compression/decompression functions can be implemented with any or all other functions of the FIG. 1 system in a single ASIC using a single processor. Further, those skilled in the art will appreciate that the compression and decompression functions of the FIG. 1 system can be implemented in software or hardware. In the exemplary FIG. 1 embodiment, the compression functions are implemented using software and hardware, while the decompression functions are primarily implemented in hardware.

Once a frame of image data has been compressed and stored in the compression/decompression coprocessor, it can subsequently be transferred to the printer engine 102 via a system bus 110 and a video interface device (VID) 112. The video interface device can, for example, be formed as a separate ASIC chip having a decompression processor to support decompression and half-toning. Alternately, a single processor can be used to implement the functions of the controller 106, the coprocessor 108 and video interface device 112. The video interface device provides high quality reproduction of the original image from its compressed format.

The FIG. 1 system further includes an input/output (I/O) communications device 114. The input/output communications device can include, for example, built-in networking support as well as parallel/serial I/O ports. Further, the I/O communications device can include additional memory as well as memory expansion ports. Any conventional I/O communications features can be used in accordance with the present invention, such that the I/O communications device need not be described in detail.

2. Uncompressed Image Data Format

An input frame of image data associated with an original image has a given width and length. The number of pixels in a given row of a scan line across the width of the frame is set in a horizontal total pixel count register. In accordance with exemplary embodiments of the present invention, the value set in the horizontal total pixel count register is divisible by 4.

In a vertical direction, along the length of the frame (and in the case of printing, along the paper motion direction), the number of pixels is set in a vertical total pixel count register. Again, the value set in the vertical total pixel count register of exemplary embodiments is divisible by 4.

In accordance with exemplary embodiments, the user can also set the number of bits used to represent each color component for a given pixel to 1, 4 or 8 bits. For example, if the user selects 4 color components to define a pixel, with each color component being represented by 8 bits, then each pixel would be represented as a 32-bit word (that is, 8 bits for each of the cyan, magenta, yellow and black color components).

In accordance with exemplary embodiments, the color of a pixel can be represented by any number of color components, including 1, 3 or 4 color components. For example, a four color component representation includes cyan, magenta, yellow and black color components. For a given application, when the number of color components used to represent a given color is set to 1, the color of a pixel is defined by the magnitude of a single color component (such as black). When the number of color components is set to three, the color components used can be cyan, magenta and yellow color components. When the number of color components is set to be four, the 4 color components mentioned above can be used to define the color of a given pixel.

Where each of four color components in each pixel of a pixmap is encoded with 8-bits, a letter-size page having approximately 32 million, 600 dots per inch (dpi) color pixels, requires approximately 128 Megabytes of memory to store the page. Because a memory requirement of 128 Megabytes per page is cost prohibitive, exemplary embodiments of the present invention are directed to compressing this data using a partitioned input frame of image data.

3. Preprocessing of Image Data

As mentioned previously, image data which is received for storage in an image data input frame buffer of memory 104 is preprocessed. The preprocessing can include partitioning the frame into blocks having a predetermined number of pixels. Once partitioned further processing of the frame of image data can include: (a) scaling a frame of digitized image data to ensure that each partitioned block will have the same number of pixels; (b) resampling the image data to account for misalignment between the frame of image data and partitioned blocks and/or (c) any other desired processing of the data.

In accordance with the exemplary embodiment described herein, an input frame 300 of image data is partitioned, in a first level of partitioning, into blocks which represent subimages 302, as illustrated in FIG. 3a. These subimages can, if desired, be further subdivided, in a second level of subpartitioning, to form partitioned areas formed as 4-by-4 pixel arrays within each subimage for purposes of enhancing subsequent processing. For example, the partitioned areas of each subimage can be compressed in a manner as described in commonly assigned U.S. application Ser. No. 08/397,372, filed Mar. 2, 1995 (Attorney Docket No. P1481/149), entitled "METHOD AND APPARATUS FOR COMPRESSION OF DIGITIZED IMAGE DATA USING VARIABLE COLOR FIDELITY" the contents of which are hereby incorporated by reference in their entirety. The exact block size can be set by the user as a block size field stored in a register.

Those skilled in the art will appreciate that both the partitioned subimages and the partitioned blocks can have any number of pixels, and that the subimages and blocks can be of any desired shape. Alternately, the partitioned subimages can be considered the subpartitioned blocks if no further subdividing is desired. Accordingly, for purposes of simplifying the following discussion, only the partitioning of an image into subimages will be discussed with respect to the subdivided images. Those skilled in the art will appreciate that features described with respect to the subdivided images can be applicable to any one or more levels of partitioning.

In an exemplary embodiment, the subimages are capable of being tiled in non-overlapping fashion to encompass the entire image. For example, the shape of each partitioned subimage need not be square, but can be rectangular, cross-shaped or shaped as described in "Tilings and Patterns, an Introduction", by W. H. Freeman, New York, 1989, ISBN 0-7167-1998-3, the disclosure of which is hereby incorporated by reference. For example, the skewed patterns of FIGS. 2a and 2b can be specified as a tile shape for the subimages in a frame of image data.

Those skilled in the art will appreciate that such partitioning is not limited to a single shape, but can be a combination of shapes. Further, those skilled in the art will appreciate that non-tiled and/or non-overlapped blocks can be used at some possible expense to the compressed buffer size and/or the integrity of the compressed data relative to the original image.

Figure 3B:
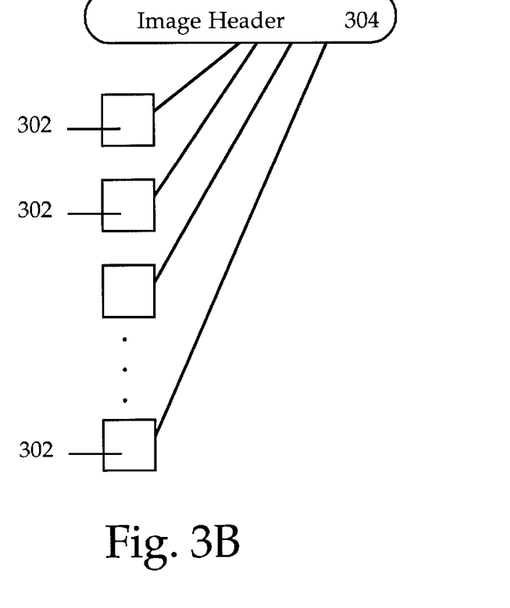

In accordance with exemplary embodiments, enhanced processing of partitioned image data is performed in a manner which permits efficient processing without sacrificing the quality of a reconstructed image. In accordance with exemplary embodiments, the processor 106 of FIG. 1 can be used to implement a method for processing image data by dividing a frame of received image data into a plurality of non-overlapping subimages as illustrated in FIG. 3a. As the frame of image data is divided, global information regarding the overall input frame of image data is retained and stored with each of the subimages as represented by the association of an image header 304 with each stored subimage in FIG. 3b.

Figure 3C:
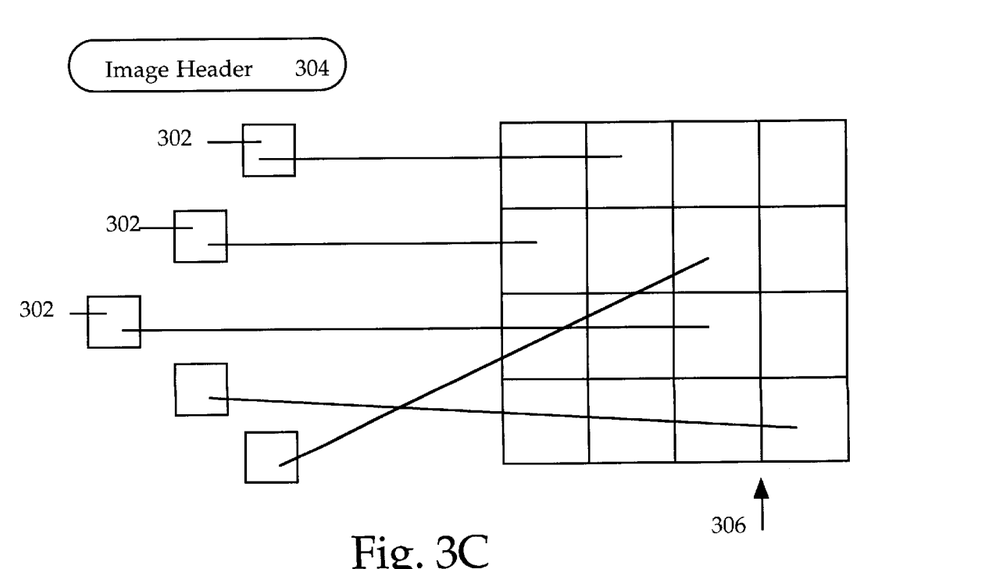

Global information can, for example, include information regarding the transformation matrix for transforming the input frame of image data into the output frame of image data, size of the image, image resolution and so forth. For example, the global information can identify the overall size of an image (e.g., 100 pixels by 100 pixels), and an origin reference location to which all other pixels in the image can be correlated. The origin reference location can, in an exemplary embodiment, be user specified to correspond with the pixel location (0,0) in a two-dimensional space (e.g., x-y space) of the input frame buffer, representing the top left pixel in an image to which all subimages will be correlated. The global information of the input frame of image data can be stored with each divided subimage so that as the image is reconstructed in the output frame of image data, as shown by the reconstructed output frame 306 in FIG. 3c, this information is available to enable precise reconstruction. Alternately, the global information can be stored in a memory location (e.g., look-up table) which is separate from the subimage but which is known in advance, or which is pointed to by a pointer of the subimage header. Those skilled in the art will appreciate that the global information can be stored in any location which can be identified and accessed at the time boundary information is to be used to partition the output frame buffer.

In addition, each subimage can be stored with local information which represents a relative position of the subimage with respect to the original frame of image data from which the subimage was derived. The frame of image data is divided according to a user-configured number of partitions. For example, the user can configure an input frame of image data corresponding to a 100 pixel by 100 pixel image into four hundred partitioned subimages of 5 by 5 pixels. The twenty subimages in the first row will have top left pixel locations at locations (0,0); (5,0); (10,0) . . . (95,0), respectively, relative to the origin reference of (0,0). Each of the remaining 19 rows of subimages will be similarly correlated to the origin reference location. As with the global information, the local information can also be alternately stored in a memory location which is separate from the subimage, but which is known in advance, or which is pointed to by a pointer in the subimage header. Those skilled in the art will appreciate that the local information can be stored in any location which can be identified and accessed when boundary information is to be established for a given subimage.

The overall geometry information and the relative positional information can thus be used to collectively represent information which identifies boundaries between subimages. Each subimage is associated with header information used to identify common attributes regarding overall geometry of the original image, and which includes information that identifies a relative position of each subimage with respect to the overall geometry.

The relative position of each subimage with respect to the overall frame of input data, represented as a coordinate location of the top left pixel for each subimage in the above example, can be precomputed and stored at the time the original frame of input image data is subdivided into the plurality of subimages. In addition to a reference coordinate location, the relative position identified in the header of each subimage can also include information that identifies boundaries between the subimage and all bordering subimages. This boundary information can, for example, include the local header information which identifies the relative position of each bordering subimage, and/or information which identifies the boundary pixel locations themselves. Alternately, the boundary information can be precomputed in the output frame buffer based on global information which identifies how the input image was partitioned. As mentioned previously, all or any portion, of such information can be stored directly in the header, or can be stored in the header as a pointer to some other location in memory.

Once the global and relative positional information has been calculated and stored as a header for all subimages in the input frame of image data, the frame of image data can be processed into subimage locations in memory. In accordance with exemplary embodiments, the entire frame of input image data can be stored and processed into subimage data, and then afterwards, mapped to the output frame buffer. Alternately, as subimage data is received, it can be processed to the output frame buffer without waiting for receipt of image data with respect to remaining subimages, and without concern that overall degradation in quality of an image associated with the output frame of image data will occur.

More particularly, as the image data associated with one or more subimages is being received by the input frame buffer, earlier stored image data can be mapped to the output frame buffer. Boundary information of the output frame buffer can be obtained from, or computed on the basis of, the subimage header information. Alternately, the boundary information can be incorporated into a bit map which is constructed from the header information and which identifies pixels in the input space that correspond to boundaries between subimages. For example, where boundaries in the output frame buffer are to be computed, an equation associated with the transformation matrix can be used to identify where the boundaries occur.

In the example above, where the transformation matrix specifies a scaling of the input image frame of data by an irrational number of √5, reference locations of various subimages relative to the origin reference location would include irrational pixel locations. That is, the reference position for each of the subimages in the first row of an output frame buffer would be at pixel locations of (0,0); (11.18,0); ... (212.42,0). Of course, no pixel locations can be mapped to irrational locations in the output frame buffer. It is an inability of conventional forward mapping techniques to effectively deal with these boundary situations that results in holes in the output image. However, in accordance with exemplary embodiments, the boundaries for each subimage are mapped in advance to pixel locations which can be identified using the header information.

More particularly, when the first subimage of image data is being processed, the boundary between the first subimage and the second subimage in the output image is either acquired from memory or precomputed using information in the header. An irrational boundary is, in an exemplary embodiment, truncated to a rational number. Thus, for the first subimage, the boundary between the first and second subimages is (11.18,0), and would be truncated to a pixel location of 11. Similar boundary processing can be performed for other subimages adjacent the first subimage. For example, the boundary of the first subimage in the first row with respect to the first image in the second row, located at reference location (0,11.18), would also be truncated. Pixels of the first subimage in the input frame of image data can then be forward mapped to the pixel locations in the output frame of image data to create an 11×11 subimage (pixel positions 0→10 for both x and y directions) in the output frame buffer.

To process the second subimage of input data, the header information for the second subimage is retrieved from memory. Recall that the second subimage was referenced to the origin with the header (5,0) in the input frame of image data. Accordingly, when the value of is scaled using the transformation matrix value of √5, it is immediately recognized that the irrational number of 11.18, representing the boundary between the first and second subimages, would have been truncated.

As a result, the second subimage is mapped from the pixel location 11 to the boundary between the second and third subimages. The boundary between the second and third subimages can be determined in the same manner used to determine the boundary between the first and second subimages. This boundary is represented by the pixel location which corresponds to 10 in the input frame of image data, scaled by the factor of √5, to a pixel location of (22.36,0) in the output frame. Because this is an irrational number, the second subimage can be mapped as a subimage having 11 columns of image data in the output frame (from location 11 to 21).

The foregoing process can be repeated, using relative positions of the subimages with respect to one another and with respect to the origin reference location to identify boundary locations in the output frame of data. Complete mapping of all pixels in the output frame buffer, up to the boundaries, can be realized. Because boundaries between subimages can be accurately precomputed and placed in the output frame buffer using the exemplary embodiments of the present invention, an accurate forward mapping of pixels in each subimage is achieved.

Figure 4:
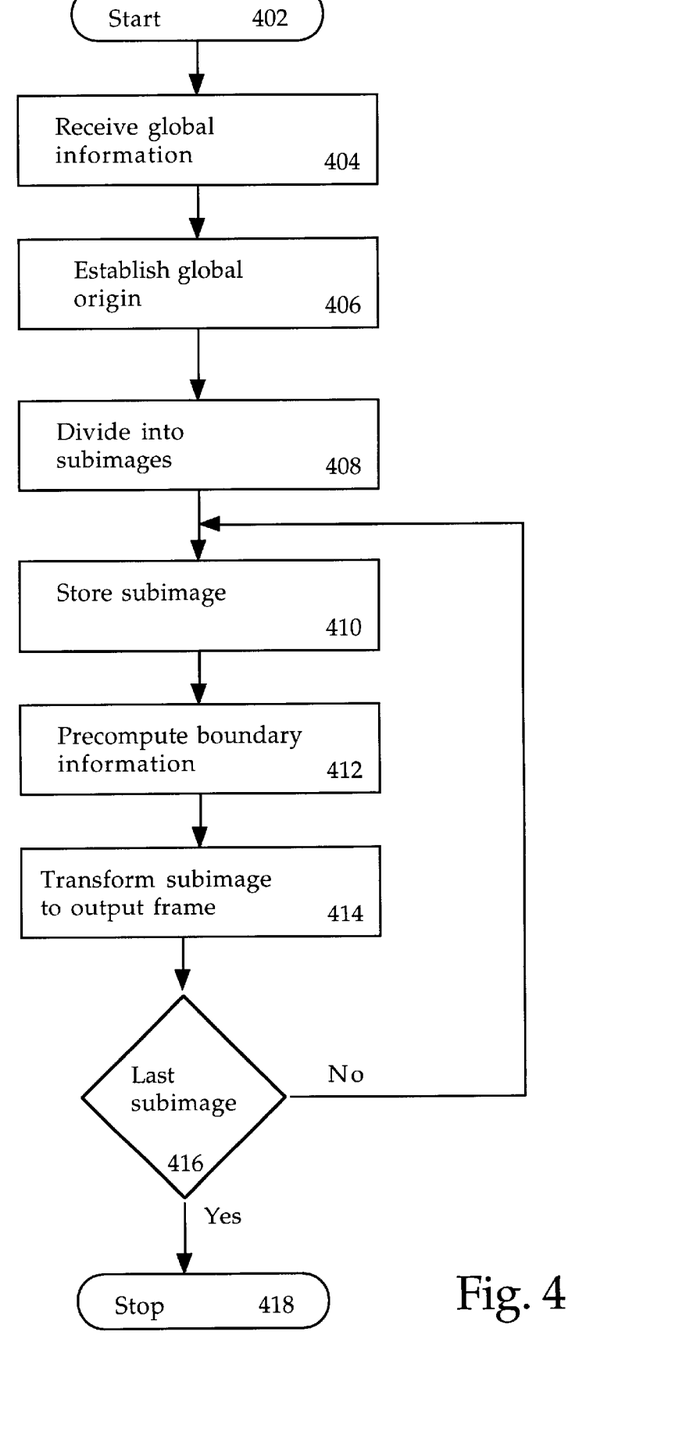
FIG. 4 illustrates a flow chart of a method for processing image data in accordance with an exemplary embodiment of the present invention.

Referring to FIG. 4, a flow chart representing an exemplary method for implementing the present invention is set forth. In block 402, a processing of a frame of input image data is initiated. As represented in block 404, when an input frame of image data is received, global information is included to identify characteristics of the input image, such as the transformation matrix, image resolution, size of the image, and an output location of the frame buffer. When this data is received, a processor 106 establishes a global origin reference location for the image. As described previously, this origin can, for example, be a pixel location (0,0) in the input frame buffer. The establishment of a global origin is represented by the block 406 in FIG. 4.

After establishing a global origin, the processor further divides the input image into subimages based on user-configured specifications to derive the relative positional information, including boundary information, as local information. In the above example, a 100 pixel by 100 pixel image was partitioned into subimages of 5 pixels by 5 pixels, with boundary information being stored in a memory associated with the input space of the input frame buffer.

In block 410, the processor renders the input frame of image data by first generating an image header in response to the global origin and relative positional information of each subimage based on the partitioning. The global information and relative positional information, are then stored with the subimage data as represented by block 410.

Once the header information and subimage data have been stored for at least one subimage, boundary information can be used to determine boundaries in a transformed image space, as represented by block 412. The boundaries of the transformed image space can be accessed from header information, or can be precomputed based on header information for use in the transformed image space. In the above example, the transformed image space is the output frame buffer. Each pixel of the subimage can then be forward mapped to the output image space using the transformation matrix of the global information, as represented by block 414.

As mentioned previously, exemplary embodiments of the present invention provide forward mapping of image data for each subimage as it is received in the input frame buffer. This forward mapping of image data can be performed after the boundaries associated with the subimage have been determined for the output space. As represented by decision block 416, once a given subimage has been stored in the output frame buffer, a subsequent subimage can be processed, until the entire input frame of image data has been processed, as indicated by block 418. Alternately, as mentioned previously, multiple processors can be used to transform subimages from the input frame buffer to the output frame buffer in parallel.

While the example described with respect to FIG. 4 uses a computation of boundaries in the output frame buffer which permits accurate forward mapping of the subimage data, those skilled in the art will appreciate that the invention is not so limited. For example, boundary information can be stored as a bit map as described above. In accordance with exemplary embodiments, the bit map can be formed using the transformation matrix information to thereby identify the specific mapping of the pixels from the input frame to the output frame on a pixel by pixel basis. Exact pixel locations in the output frame buffer which correspond to boundaries can be identified for the entire frame of image data and stored in bit map locations which are indexed by the subimage header information. Alternately, to save memory, a bit map can be created for a given subimage at the time the subimage is being transformed into the output frame buffer space using header information. Afterwards, each pixel of the input frame buffer can be mapped to the output frame buffer using the bit map.

In summary, the image header information is received and processed, during rendering, before the actual image data associated with the subimage. This information is used to transform each subimage into an output device space, and to precompute the pixels in the output frame which correspond to the geometrical shape and relative position of the transformed subimage. As a result, all pixel locations in the output frame buffer associated with a given subimage can be mapped to pixels of the input subimage. This process can be repeated for each divided subimage until the entire frame of image data is reconstructed in the output device space.

Those skilled in the art will appreciate a transformation matrix can perform any of a variety of processes on the frame of input data. For example, the transformation matrix can include scaling for magnifying or reducing the scale of the frame of input data to that of a user specified output device. In addition, the transformation matrix from the input device space to the output device space can include rotation and/or shear terms.

In accordance with exemplary embodiments, wherein subimage information is stored with global information and relative placement information, enhanced processing of the input frame of image data can be performed on a subimage-by-subimage basis to an output device space without concern that quality of the reconstructed image in the output device space will be sacrificed. As a result, exemplary embodiments of the present invention can implement a transformation of a frame of input image data to a frame of output image data using a forward mapping from the input device space to the output device space without concern that the reconstructed image will include holes or boundary artifacts. The quality previously only associated with conventional inverse mapping techniques can therefore be achieved with a performance comparable to or better than that associated with conventional forward mapping techniques.

Those skilled in the art will appreciate that exemplary embodiments of the present invention can be embodied as software which can be used in conjunction with a processor, such as processor 106 of FIG. 1. For example, exemplary embodiments of the present invention can be implemented as a computer readable medium which, in response to receipt of a frame of input image data, divides the image data into a plurality of non-overlapping subimages, and stores each divided subimage with information used to identify a relative position of the subimage with respect to an original image from which the frame of input image data was derived.

It will also be appreciated that scaling, as described above, can be implemented in any known fashion. For example, scaling can be implemented using pixel replication as described by Dale A. Schumacher in chapter 4 ("Fast Anamorphic Image Scaling") of the book entitled *Graphic Gems II;* Arvo, James; San Diego: Academic Press, Inc. 1991, the disclosure of which is hereby incorporated by reference. It may be that a frame of image data has been generated at a resolution of 72 dots per inch. Using pixel replication, the image data can be scaled up to 150 dots per inch for subsequent transfer to the compression/decompression coprocessor. Alternately, the input image data for a given subimage can be expanded to a size greater than an expected size of the transformed image in the output frame buffer, and then cut back in the output frame buffer to conform with the boundaries of the subimage in the output frame buffer.

Those skilled in the art will appreciate that any scaling techniques can be used in accordance with exemplary embodiments of the present invention. Such scaling techniques can be used to either scale up or scale down an input frame of image data to any user selected resolution.

Further, those skilled in the art will appreciate that once partitioning of the input frame of image data has been performed and all headers created, any desired preprocessing of the frame of image data can be performed as part of the transformation. As mentioned previously, the preprocessing can include, for example, a resampling to match the input frame of image data to characteristics of an output device space.

Using exemplary input image processing techniques as described above, resampling of the frame of image data can be performed without affecting quality of an input image. Resampling can be included as part of the transformation matrix for producing the output frame of image data from the input frame of image data. When using resampling techniques, relative placement of subimages with respect to the overall frame of input data is retained in memory such that subimages in the output frame of image data can be properly placed and boundaries between subimages accurately located.

In accordance with exemplary embodiments, a frame of image data is resampled when the center of a predefined pixel block does not align with the center of a partitioned block. For example, it is possible that an incoming frame of image data is already at the desired resolution, such that scaling of the data is not necessary. However, the image data may not be aligned with the preselected partitions of the memory where the uncompressed is stored (for example, the frame buffer).

For example, the image data may be such that the first partitioned block of pixels in the frame buffer is only half full of data (that is, either the first two rows or the first two columns of a partitioned block contain no image data). In this case, the image data included within the pixel block is resampled such that the center of the resampled data is repositioned in alignment with the center of a partitioned block. This repositioning can be achieved by any conventional resampling technique. For example, resampling can be achieved using spatial filtering, nearest neighbor filtering, bi-linear interpolation, bi-cubic interpolation and so forth, without concern that the reconstructed image will have degraded quality.

Once preprocessing of the image data has been completed, those skilled in the art will appreciate that the partitioned output frame of image data can be subsequently processed in any way. For example, once partitioned, the output frame of image data can be compressed for storage and then later reconstructed from its compressed form. Where data is to be compressed, such compression and subsequent decompression can be performed in accordance with exemplary embodiments of the described in commonly assigned U.S. application Ser. No. 08/397,372.

Exemplary embodiments of the present invention are directed to using a base resolution of 600 dots per inch, with each pixel including four color components of cyan, magenta, yellow and black. Each such color component, in exemplary embodiments, is one of 256 values. An entire pixmap, in accordance with exemplary embodiments is partitioned into non-overlapping blocks having a 4-by-4 pixel configuration. Thus, each partitioned block has a resolution of 150 dots per inch.

While the foregoing has set forth exemplary embodiments of the present invention, those skilled in the art will appreciate that these examples are by way of illustration only. For example, while exemplary embodiments have been described in connection with pixmaps used with an output printing device, those skilled in the art will appreciate that techniques of the present invention are also suitable for the reduction of information transmitted between computers, or between a computer and an input device such as a scanner, or between a computer and an output device (such as a printer).

Further, those skilled in the art will appreciate that the partitioned blocks described above can be of any dimension. Further, the partitioning can be adaptive and dynamic, even within a given frame of image data, with the only requirement being that dimensional information be made known to the decompression process.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for transforming an image from a first space to a second space, comprising the steps of:
   partitioning he image into a plurality of non-overlapping subimages;
   determining position information that identifies a relative placement of each subimage within the image in the first space;
   using the position information to determine boundaries between the subimages in the second space; and
   forward mapping the image to all pixels within the boundaries in the second space by independently transforming each subimage to its corresponding boundaries in the second space, wherein for each subimage the boundaries between the subimage and adjacent subimages in the second space are determined before transforming the subimage.

2. The method of claim 1, wherein each subimage is mapped to all pixels in the second space that are within ones of the boundaries in the second space that separate the subimage from adjacent subimages.

3. The method of claim 1, wherein transforming the subimages includes at least one of rotating, skewing, scaling, and translating each subimage.

4. The method of claim 3, wherein transforming the subimages includes rotating each subimage.

5. The method of claim 1, further comprising the steps of compressing and decompressing the subimages.

6. The method of claim 1, wherein the subimages are sequentially transformed.

7. The method of claim 1, wherein at least some of the subimages are simultaneously transformed using multiple processes.

8. The method of claim 1, wherein the position information includes positions of the subimages in the first space with respect to one another.

9. The method of claim 1, wherein the position information includes positions of the subimages with respect to an origin reference location in the image.

10. The method of claim 1, wherein the position information includes an overall size of the image.

11. The method of claim 1, wherein the position information identifies boundaries between each subimage and all adjacent subimages in the first space.

12. The method of claim 1, wherein the image is a subimage of another image.

13. The method of claim 1, wherein the position information is determined when the image is partitioned.

14. The method of claim 1, wherein the position information for each subimage is stored with the subimage.

15. The method of claim 1, wherein the boundaries in the second space are determined by transforming boundaries between the subimages in the first space.

16. The method of claim 1, further comprising the steps of:
   expanding image data for at least one of the subimages in the first space to a size greater than an expected size of the corresponding transformed subimage in the second space;
   and cutting back the expanded image data to conform with the boundaries of the corresponding transformed subimage in the second space.

17. The method of claim 1, wherein the position information is common among the subimages.

18. A method for processing image data, comprising the steps of:

receiving a frame of input image data;

dividing the frame of input image data into a plurality of non-overlapping subimages in an input space;

storing boundary information for each of the plurality of non-overlapping subimages;

transforming the boundary information to an output space; and for each subimage, independently transforming the subimage to all pixels in the output space within boundaries defined by the transformed boundary information of the subimage, after transforming the boundary information of the subimage to the output space.

19. A computer readable medium containing program instructions for:

receiving a frame of input image data;

dividing the frame of input image data into a plurality of non-overlapping subimages in an input space;

storing boundary information for each of the plurality of non-overlapping subimages;

transforming the boundary information to an output space; and for each subimage, independently transforming the subimage to all pixels in the output space within boundaries defined by the transformed boundary information of the subimage, after transforming the boundary information of the subimage to the output space.

20. Apparatus for processing image data comprising:

means for receiving a frame of input image data;

means for dividing the frame of input image data into a plurality of non-overlapping subimages in an input space;

means for storing boundary information for each of the plurality of non-overlapping subimages;

means for transforming the boundary information to an output space, and for each subimage, independently transforming the subimage to all pixels in the output space within boundaries defined by the transformed boundary information of the subimage after transforming the boundary information of the subimage to the output space.

* * * * *